(12) United States Patent
Li

(10) Patent No.: US 10,790,911 B2
(45) Date of Patent: Sep. 29, 2020

(54) MODIFIED SAGNAC LOOP COHERENT PHASE MODULATED RF PHOTONIC LINK

(71) Applicant: The University of Massachusetts, Boston, MA (US)

(72) Inventor: Yifei Li, Dartmouth, MA (US)

(73) Assignee: The University of Massachusetts, Boston, MA (US)

( * ) Notice: Subject to any disclaimer, the term of this patent is extended or adjusted under 35 U.S.C. 154(b) by 0 days.

(21) Appl. No.: 16/380,452

(22) Filed: Apr. 10, 2019

(65) Prior Publication Data

US 2019/0312651 A1    Oct. 10, 2019

Related U.S. Application Data

(60) Provisional application No. 62/655,507, filed on Apr. 10, 2018.

(51) Int. Cl.
| | |
|---|---|
| *H04B 10/61* | (2013.01) |
| *G02F 1/035* | (2006.01) |
| *H04L 27/152* | (2006.01) |
| *H04B 10/25* | (2013.01) |
| *G02F 1/025* | (2006.01) |

(52) U.S. Cl.
CPC .......... *H04B 10/616* (2013.01); *G02F 1/035* (2013.01); *H04B 10/25891* (2020.05); *H04L 27/152* (2013.01); *G02F 1/025* (2013.01); *G02F 2202/20* (2013.01)

(58) Field of Classification Search
CPC .............. H04B 10/616; H04B 10/2504; H04B 10/148; H04B 10/532; G02F 1/035; G02F 2202/20; G02F 1/25; G02F 1/01; G02F 1/225; H04L 27/152; G06E 1/00
USPC .................................................. 398/202, 188
See application file for complete search history.

(56) References Cited

U.S. PATENT DOCUMENTS

| | | | | |
|---|---|---|---|---|
| 4,215,427 A | * | 7/1980 | Waggener | H04L 27/22 367/83 |
| 5,796,764 A | * | 8/1998 | Corsini | H01S 3/063 372/102 |
| 6,262,834 B1 | * | 7/2001 | Nichols | G02F 1/225 359/238 |
| 6,671,056 B2 | * | 12/2003 | Szafraniec | G01J 9/04 356/477 |
| 6,879,433 B1 | * | 4/2005 | Yamashita | G02F 1/3536 359/326 |

(Continued)

FOREIGN PATENT DOCUMENTS

CN    105607299 A    5/2016

OTHER PUBLICATIONS

Shilei Jin et al., "Recent progress in attenuation counterpropagating optical phase-locked loops for high-dynamic-range radio frequency photonic links". vol. 2, No. 4, Aug. 2014, Photon. (Year: 2014).*

(Continued)

*Primary Examiner* — Abbas H Alagheband
(74) *Attorney, Agent, or Firm* — Brake Hughes Bellermann LLP

(57) ABSTRACT

A Sagnac loop coherent phase modulated RF photonic link employing an ACP-OPLL linear phase demodulator was presented. This structure demonstrated stable signal transmission over a 1-km long coherent RF photonic link.

11 Claims, 6 Drawing Sheets

(56) References Cited

U.S. PATENT DOCUMENTS

| | | | | |
|---|---|---|---|---|
| 7,602,333 | B2* | 10/2009 | Hiramatsu | H01Q 13/24 |
| | | | | 342/134 |
| 7,653,318 | B2* | 1/2010 | Li | H04L 7/0075 |
| | | | | 398/204 |
| 7,835,650 | B2* | 11/2010 | Li | H04B 10/2575 |
| | | | | 398/202 |
| 8,554,023 | B2* | 10/2013 | Ruchet | G02F 1/2252 |
| | | | | 385/1 |
| 8,818,203 | B2* | 8/2014 | Ji | G02F 1/225 |
| | | | | 398/182 |
| 8,909,067 | B2* | 12/2014 | Takeguchi | H04B 10/5053 |
| | | | | 398/182 |
| 9,634,786 | B2* | 4/2017 | Zheng | H04J 14/06 |
| 9,923,631 | B1* | 3/2018 | Moilanen | H04B 17/00 |
| 2002/0122180 | A1* | 9/2002 | Szafraniec | G01J 9/04 |
| | | | | 356/484 |
| 2007/0280579 | A1* | 12/2007 | Li | G02F 1/0356 |
| | | | | 385/3 |
| 2012/0189238 | A1* | 7/2012 | Ruchet | G02F 1/2252 |
| | | | | 385/1 |
| 2012/0219285 | A1* | 8/2012 | Dahan | H04B 10/07953 |
| | | | | 398/26 |
| 2018/0048113 | A1* | 2/2018 | Fermann | H01S 3/0085 |
| 2018/0136688 | A1* | 5/2018 | Gilbert | G02F 1/39 |

OTHER PUBLICATIONS

J. H. Schaffner and W. B. Bridges, "Intermodulation distortion in high dynamic range microwave fiber-optic links with linearized modulators," J. Lightw. Technol., vol. 11, No. 1, pp. 3-6, Jan. 1993.

Y. Li et al., "A monolithically integrated ACP-OPLL receiver for RF/photonic links," IEEE Photon. Technol. Lett., vol. 23, No. 20, pp. 1475-1477, Oct. 15, 2011.

S. Jin, L. Xu, P. Herczfeld, A. Bhardwaj, and Y. Li, "Recent progress in attenuation counter-propagating optical phase-locked loops for high-dynamic-range radio frequency photonic links," Photon. Res., vol. 2, No. 4, pp. B45-B53, Jul. 2014.

R. Li, X. Han, X. Chen, X. Chen, and J. Yao, "A phase-modulated microwave photonic link with an extended transmission distance," IEEE Photon. Technol. Lett., vol. 27, No. 24, pp. 2563-2566, Dec. 15, 2015.

D. Zibar, L. A. Johansson, H. F. Chou, A. Ramaswamy, M. J. W. Rodwell, and J. E. Bowers, "Investigation of a novel optical phase demodulator based on a sampling phase-locked loop," in Proc. Int. Topical Meeting Microw. Photon., Oct. 2006, pp. 1-4.

R. Wang, A. Bhardwaj, and Y. Li, "Efficient RF frequency down-conversion using coupled quantum-well optical phase modulator," IEEE Photon. Technol. Lett., vol. 23, No. 10, pp. 645-647, May 15, 2011.

T. T. M. Van Schaijk, D. Lenstra, K. A. Williams, and E. A. J. M. Bente, Model and experimental validation of a unidirectional phase modulator, vol. 26, Optics Express No. 25, Dec. 10, 2018.

Ed L. Wooten et al., A Review of Lithium Niobate Modulators for Fiber-Optic Communications Systems, IEEE Journal of Selected Topics in Quantum Electronics, vol. 6, No. 1, Jan./Feb. 2000 [10] Qi-Ming Lu, Qi Shen, Yuan Cao, Sheng-Kai Liao and Cheng-Zhi Peng, An ultra-sensitive balanced detector with low noise for continuous-variable quantum key distribution, arXiv:1806.03394v1 [physics.ins-det], Jun. 9, 2018.

* cited by examiner

MODIFIED SAGNAC LOOP COHERENT PHASE MODULATED RF PHOTONIC LINK

CROSS-REFERENCE TO RELATED APPLICATIONS

This application claims priority to U.S. Provisional Patent Application No. 62/655,507, entitled MODIFIED SAGNAC LOOP COHERENT PHASE MODULATED RF PHOTONIC LINK WITH AN ACP-OPLL filed Apr. 10, 2018, which is incorporated herein by reference in its entirety and for all purposes.

STATEMENT REGARDING FEDERALLY SPONSORED RESEARCH OR DEVELOPMENT

This invention was made with U.S. Government support from U.S. Air Force Office of Scientific Research under Grant FA9550-12-1-0194. The U.S. Government has certain rights to the invention.

BACKGROUND

These teachings relate generally to RF/Photonic links and, more specifically, modified Sagnac loop coherent phase modulated rf photonic link with an ACP-OPLL.

RF/PHOTONIC link is desirable for remoting antenna from its signal processing unit. Previous RF Photonic links often have limited spurious-free dynamic range (SFDR). For solution, a coherent phase modulated link with an attenuating-counter-propagating optical phase locked loop (ACP-OPLL) photonic integrated circuit (PIC) demodulator has been proposed (see FIG. 1). The ACP-OPLL linearly demodulates the optical phase by tight phase tracking. It needs a large open loop gain over wide bandwidth. It order to assure feedback stability, the ACP-OPLL must minimize its propagation delay (<20 ps). Therefore, in order to reduce the delay, it should be realized as a photonic integrated circuit. With the help of the ACP-OPLL PIC, the coherent link has already demonstrated an SFDR greater than 130 dB·Hz$^{2/3}$. In order for the link to operate, the DC optical phase should be locked at quadrature. However, the phase coherent system is sensitive to environmental perturbations. The environmental perturbation can easily generate a random optical phase fluctuation beyond the tracking range of the ACP-OPLL demodulator. Thus, a slow feedback control with a large phase tracking range is needed in conjunction with the ACP-OPLL to compensate the random phase fluctuations. But this is insufficient for a link with long (>1 km) distance, as the random phase fluctuation is proportional to the length of the optical fiber and the slow feedback control also has a limitation in its phase tracking range. This represents a major obstacle for field applications of the new coherent phase modulated RF Photonic link structure with an ACP-OPLL linear demodulator.

On the other hand, the Sagnac loop topology has been proposed as a means to mitigate the random optical perturbation in coherent phase modulated RF photonic links. In the Sagnac loop configuration the phase fluctuations in clockwise and counter-clockwise propagating signal should cancel due to the symmetry between the two propagation directions. However, the Sagnac loop topology has never been applied with the linear ACP-OPLL phase demodulator.

BRIEF SUMMARY

In one embodiment, a modified Sagnac loop coherent phase modulated RF/photonic link employing an ACP-OPLL optical receiver is disclosed. Except for the optical loss due to the long fiber, no penalties in the link noise and linearity performance were observed with the long fiber transmission.

In one or more embodiments, the RF photonic link of these teachings includes an optical coupler, optical coupler being a 2×2 optical coupler, two ports being labeled as input ports and two other ports being labeled as output ports, the optical coupler having one input port connected to an optical input source, a first circulator, one output port from the 2×2 optical coupler providing input to the first circulator, a second circulator, another output port from the 2×2 optical coupler providing input to the second circulator, a unidirectional phase modulator, the unidirectional phase modulator receiving RF input, a first optical fiber optically connecting the first circulator to one port of the unidirectional phase modulator, and a second optical fiber optically connecting an opposite port of the unidirectional phase modulator to the second circulator, the first and second circulators providing optical input to a dual input demodulator.

In one instance, the dual input demodulator is an attenuation counter-propagating optical phase locked loop (ACP-OPLL) demodulator.

In one or more embodiments, the unidirectional phase modulator of these teachings includes a first 45° Faraday rotator, an electro-optic modulator, optically positioned to receive electromagnetic radiation from the first 45° Faraday rotator, and a second Faraday rotator, optically positioned to receive electromagnetic radiation from the electro-optic modulator.

In one or more embodiments, the method of these teachings for mitigating the effect of random phase perturbations in phase modulated optical links includes splitting output from an optical source into two beams, providing one beam from the two beams to one port of an optical loop so that it propagates clockwise in the optical loop, providing another beam from the two beams to another port in the optical loop so that it propagates counterclockwise in the optical loop, the optical loop including a first optical fiber connecting the one port of the optical loop to a port of a unidirectional phase modulator, the unidirectional phase modulator, and a second optical fiber connected from an opposite port of the unidirectional phase modulator to the other port of the optical loop. The method also includes phase modulating one of a beam propagating clockwise in the optical loop or a beam propagating counterclockwise in the optical loop, providing the beam propagating clockwise in the optical loop to one input of a dual input demodulator, and providing the beam propagating counterclockwise in the optical loop to another input of the dual input demodulator.

In one instance, the dual input demodulator is an attenuation counter-propagating optical phase locked loop (ACP-OPLL) demodulator.

Other embodiments are also disclosed.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

DETAILED DESCRIPTION

The following detailed description presents the currently contemplated modes of carrying out the invention. The description is not to be taken in a limiting sense, but is made merely for the purpose of illustrating the general principles of the invention, since the scope of the invention is best defined by the appended claims.

A "dual input demodulator," as used herein, is a system receiving two input signal, at least one modulated by an RF signal, an output in a demodulated signal. Dual input demodulators include attenuation counter-propagating optical phase locked loop (ACP-OPPLL) demodulators.

A "uni-traveling-carrier photodetector (UTC-PD)," as used here in , is a photodiode that utilizes only electrons as the active carriers, as described in H. Itoh et al., Uni-Traveling-Carrier Photodiodes for High-Speed Detection and Broadband Sensing, Quantum Sensing and Nanophotonic Devices IV, Proc. of SPIE Vol. 6479, 64790X, (2007, which is incorporated by reference herein in its entirety and for all purposes.

A "Faraday rotator," as used here in, is a polarization rotator based on the Faraday effect, which in turn is based on a magneto-optic effect, where light is transmitted through a transparent medium which is exposed to a magnetic field. (see, for example, https://www.rp-photonics.com/faraday_rotators.html). In some embodiments, the Faraday rotators are ferromagnetic crystals surrounded by strong permanent magnets.

"Z-cut," as used herein, refers to one of the crystal cuts in an electro-optic modulator crystal. (See, for example, E. L. Wooten et al., A Review of Lithium Niobate Modulators for Fiber-Optic Communications Systems, IEEE Journal of Selected Topics in Quantum Electronics, Vol. 6, No. 1, JANUARY/FEBRUARY 2000, which is incorporated by reference here in in its entirety and for all purposes.)

A conventional Sagnac loop (see FIG. 2a) contains clockwise and counter-clockwise propagating signals. Both share identical physical transmission media. Therefore, they experience similar optical phase fluctuations that mutually cancel at the output.

Figure 1A:
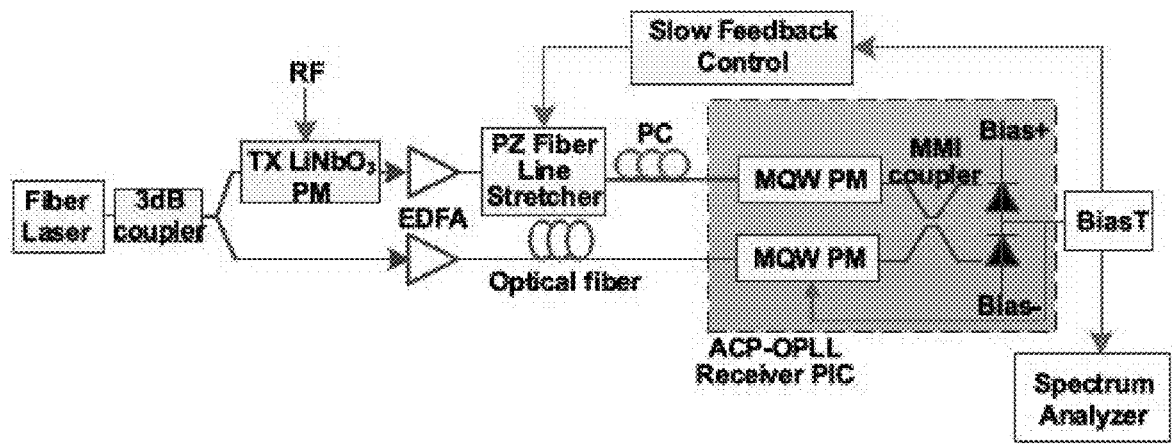
FIG. 1a shows a coherent phase modulated RF photonic link with ACP-OPLL.
Figure 1B:
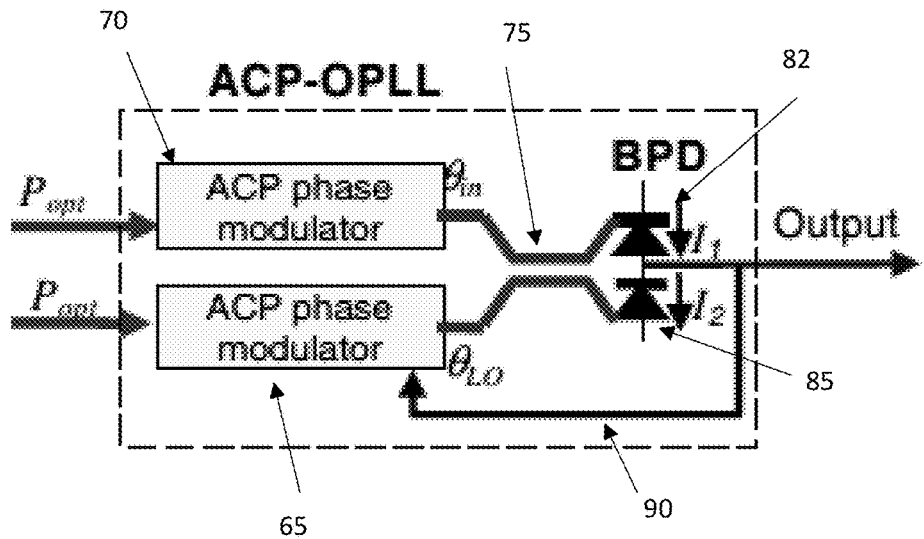
FIG. 1b shows another depiction of an ACP-OPLL.

The Sagnac loop has to be modified (see FIG. 2b) in order to be applied to the coherent phase modulated RF photonic link with an ACP-OPLL phase demodulator. (The ACP-OPLL is described in Y. Li et al., "A monolithically integrated ACP-OPLL receiver for RF/photonic links," IEEE Photon. Technol. Lett., vol. 23, no. 20, pp. 1475-1477, Oct. 15, 2011, and in S. Jin, L. Xu, P. Herczfeld, A. Bhardwaj, and Y. Li, "Recent progress in attenuation counter-propagating optical phase-locked loops for high-dynamic-range radio frequency photonic links," Photon. Res., vol. 2, no. 4, pp. B45-B53, Jul. 2014, both of which are incorporated by reference here in in their entirety and for all purposes.) An ACP-OPLL (FIG. 1a, 1b) includes a pair of ACP phase modulators 65, 70, a compact 2×2 optical coupler 75 (3 dB coupler), two ports being input ports and two other ports being output ports, an output each of the attenuation counter propagating (ACP) phase modulators being provided to one input port and a balanced photodetector (BPD) pair 82, 85, each one photodetector receiving input from one of the output ports of the coupler. There is a feedback loop from the output of the BPD pair to one of the ACP phase modulators.

Attenuation counter propagating modulators are described in US patent publication No. 200702805, Attenuating Counter-Propagating Optical Phase Modulation, published on Dec. 6, 2007, which is incorporated by reference here in in its entirety and for all purposes. In the ACP phase modulator, the optical field and the modulation RF field counterpropagate, and the RF field experiences strong attenuation. The modulator propagation delay is thereby eliminated.

Figures 2A, 2B:
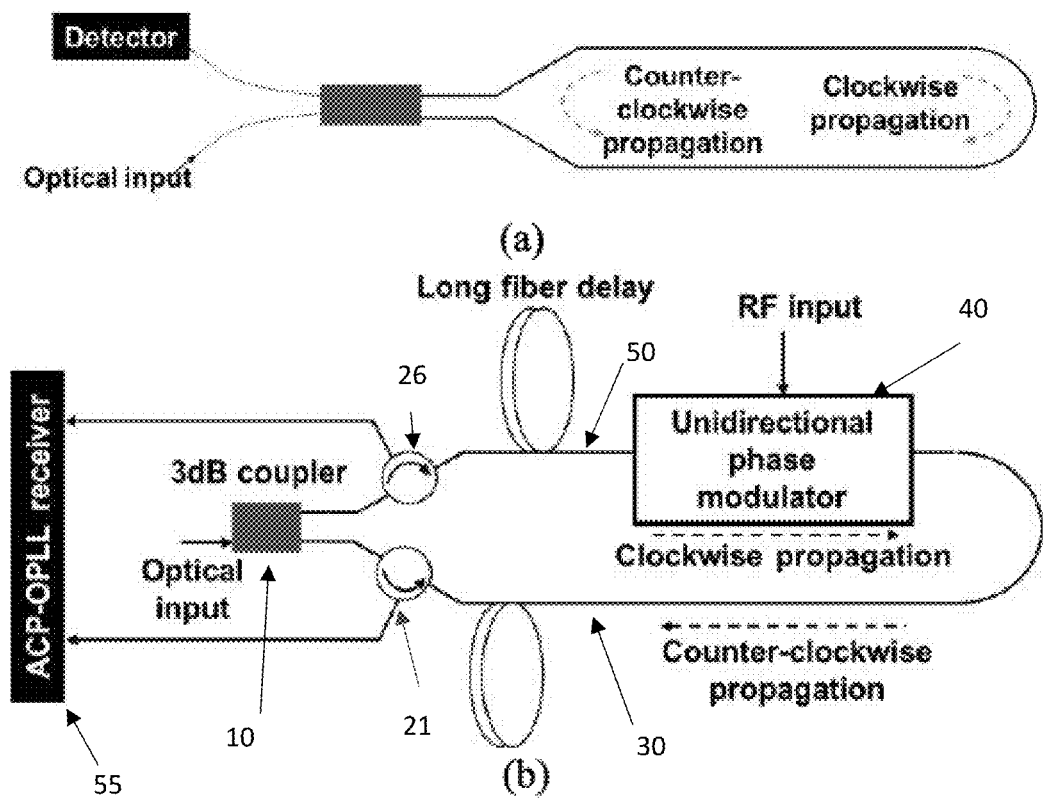
FIG. 2a shows a conventional Sagnac loop.
FIG. 2b shows a modified Sagnac loop coherent PM RF photonic link of these teachings.

FIG. 2b shows a modified Sagnac loop coherent PM RF photonic link of these teachings. Referring to FIG. 2b, in the embodiment shown therein, an optical input source is connected to an input port of a 2×2 optical coupler 10. One output port of the optical coupler 10 is connected to, and provides input to a first optical circulator 21. Another output port of the optical coupler 10 is connected to, and provides input to a second optical circulator 26. A first optical fiber 30 connects the first optical circulator 21 to one port of a unidirectional phase modulator 40. A second optical fiber 50 connects an opposite port of the unidirectional phase modulator 40 to the second optical circulator 26. The first and second optical circulators, 21, 26 provide optical input to a dual input demodulator 55. In the embodiment shown, the dual input demodulator 55 is an ACL-OPLL receiver. In one embodiment, the first and second optical fibers, 30, 50, are polarization maintaining fibers, the optical coupler is a polarization maintaining optical coupler, and the first and second circulators 21, 26 are polarization maintaining circulators.

In FIG. 2b both the clockwise and counter-clockwise optical signals were extracted by an optical circulator and then fed separately to the input ports of the ACP-OPLL, for linear phase demodulation. In addition, the RF induced optical phase modulation should be applied to only one of the two signal paths by a unidirectional optical phase modulator. These modifications break the symmetry between the two optical paths, thus making the system output subject to environment perturbations. However, the two signals still share the long optical fiber delay path. Thus, in the modified Sagnac loop configuration signal propagation inside the long fiber delay should not contribute to the environmental optical phase perturbation. This enables long distance signal transmission.

Uni-Directional Phase Modulation

An enabling key component for the modified Sagnac loop is the unidirectional optical phase modulator, where optical phase modulation should only occur when light propagates in one direction.

Figure 3:
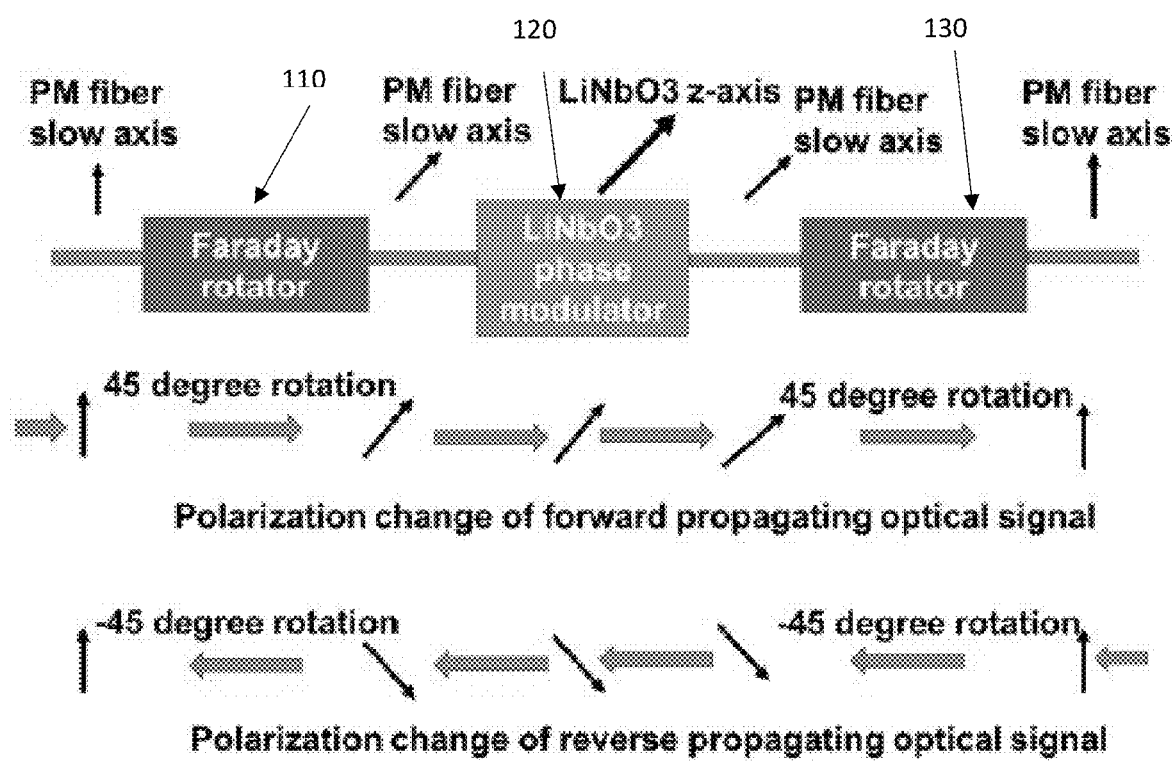
FIG. 3 is a unidirectional optical phase modulator of these teachings.

FIG. 3 shows the unidirectional phase modulator of these teachings. Referring to FIG. 3, in the embodiment shown there in, the unidirectional phase modulator includes a first 45° Faraday rotator 110, and electro-optic modulator 120 optically positioned to receive electromagnetic radiation from the first 45° Faraday rotator 110, and a second 45° Faraday rotator optically positioned to receive electromagnetic radiation from the electro-optic modulator 120.

The unidirectional phase modulator (see FIG. 3) includes, in one embodiment, a conventional z-cut traveling-wave LiNbO3 phase modulator, and two polarization maintaining (PM) fiber-inline 45-degree Faraday rotators. (In other embodiments, an x-cut electro-optic phase modulator can be used.)

In the forward propagating direction both the input and the output optical polarizations of the Faraday rotators and the LiNbO$_3$ phase modulator are aligned to the slow axis of the PM optical fiber. The light polarization state in the LiNbO$_3$ waveguide is aligned to the wafer z axis, where the light experiences strong phase modulator. It should be noted that other materials with electro-optic properties similar to LiNbO$_3$, such as, for example, lithium tantalate, are also within the scope of these teachings. Other unidirectional phase modulators, such as the one described in T. T. M. Van Schai et al., Model and experimental validation of a unidirectional phase modulator, OPTICS EXPRESS, Vol. 26, No. 25, 10 Dec 2018, which is incorporated by reference herein in in its entirety and for all purposes, are within the scope of these teachings.

In the reverse propagation direction the input light polarization is also aligned to the slow axis of the PM fiber. However, due to the −45-degree rotation, the output polarization state of the rotator is aligned to the fast axis of the optical fiber. Therefore, when the light propagates to the LiNbO3 phase modulator, its polarization stage is perpendicular to the z axis of the LiNbO3, where it only experiences negligible phase modulation. When the light enters the second rotator, its polarization state is rotated back to be parallel to the slow axis of the fiber.

Experimental Results

Figure 4:
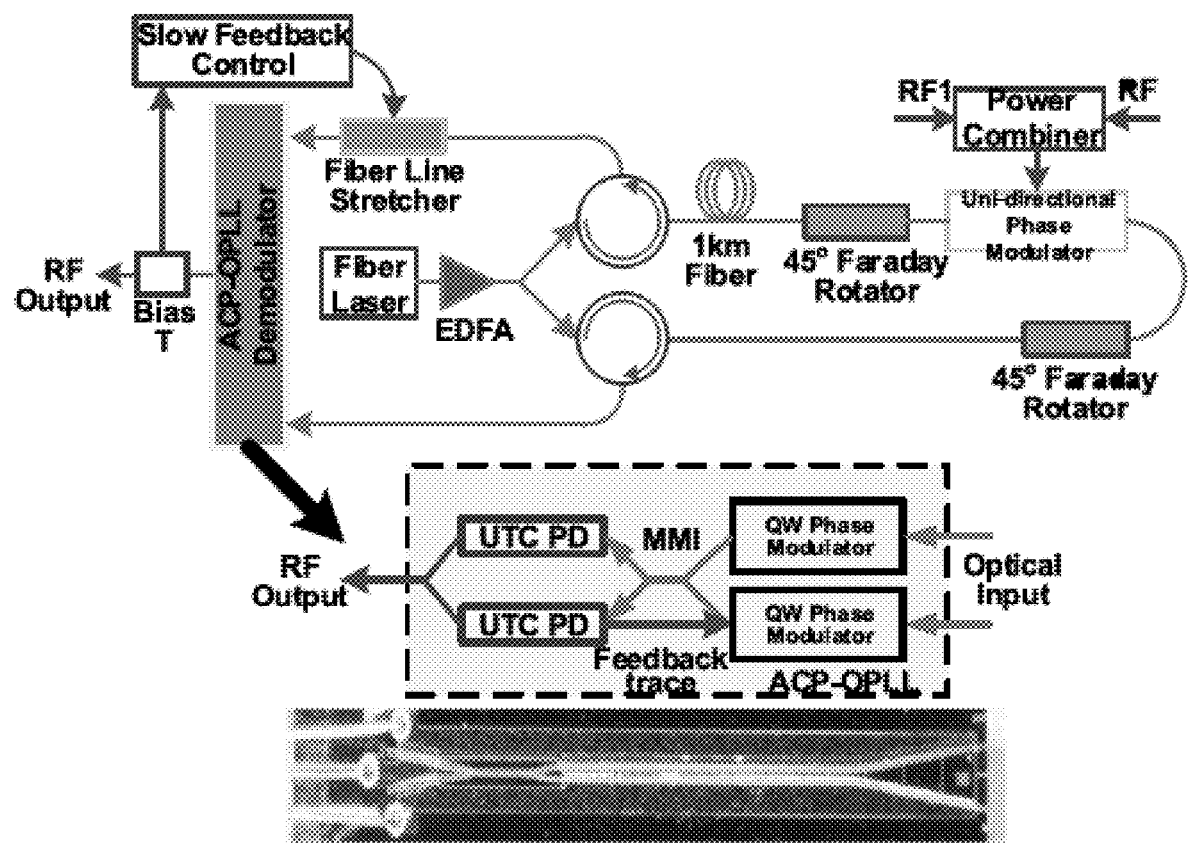
FIG. 4 is the experimental setup of these teachings.

A proof-of-concept modified Sagnac loop coherent phase modulated RF/photonic link was constructed as shown in FIG. 4. The experimental setup is polarization maintaining. A narrow-linewidth fiber laser was used for the optical source. The PM output power of the laser is ~10 mW and its linewidth is less than 10 kHz. The laser output was amplified by an EDFA and then split into two paths by a PM 3-dB coupler and created the clockwise and counter-clockwise optical signals. The loop contains 1 km long fiber transmission. The outputs of the loop were extracted by a pair of fiber based PM circulators and launched into an ACP-OPLL phase demodulator PIC chip. The ACP-OPLL PIC consists of a pair of 2 mm long push-pull ACP optical phase modulators, a pair of balanced uni-traveling carrier (UTC) waveguide photodetectors, a 3-dB optical coupler and a feedback trace that connects the balanced photodetectors to the phase modulators. The PIC chip was fabricated using Harvard university Center for Nanoscale System (CNS) facilities.

The modified Sagnac loop contains non-reciprocal optical paths, including the optical circulators, optical modulator, and Faraday rotators. They add random fluctuations to the optical phase difference between the two propagating optical waves. Thus, a slow frequency feedback is applied to a fiber line stretcher to compensate the phase fluctuations.

Figure 5:
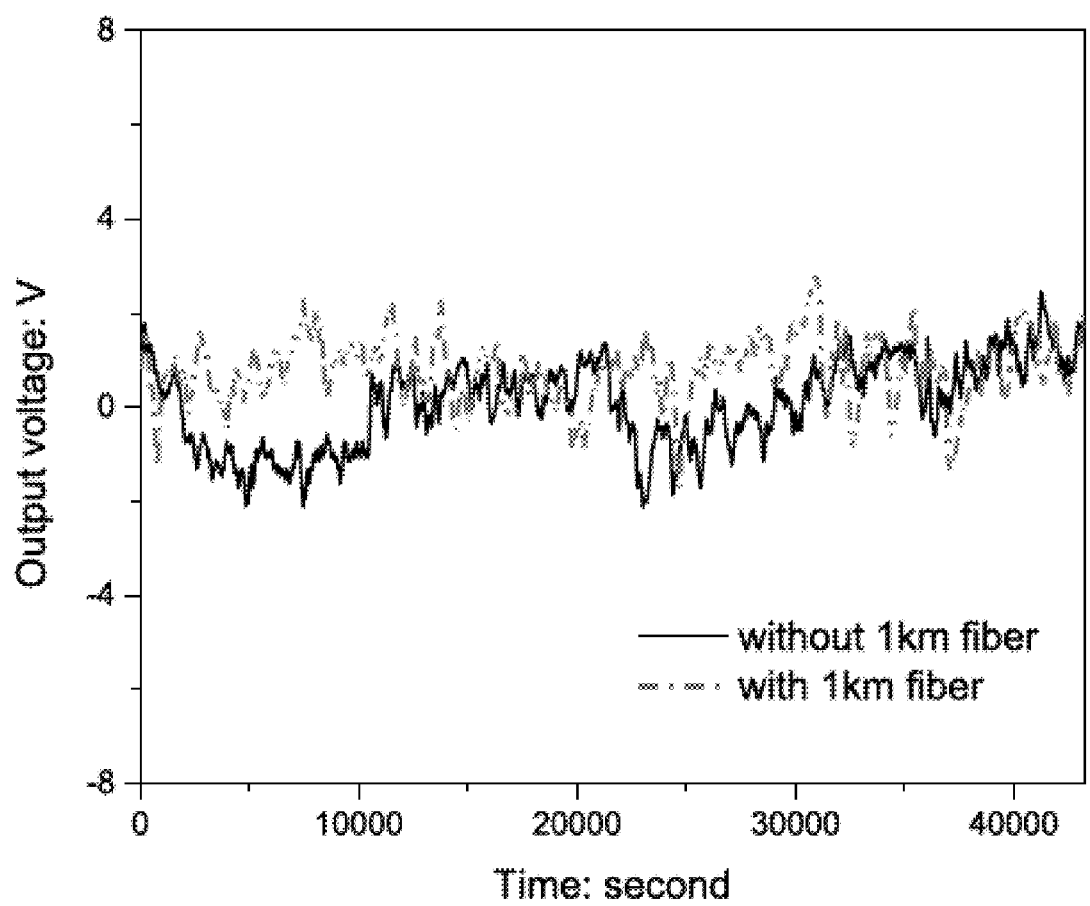
FIG. 5 shows results of the OPLL with and without 1 km optical fiber.
Figures 6A, 6B:
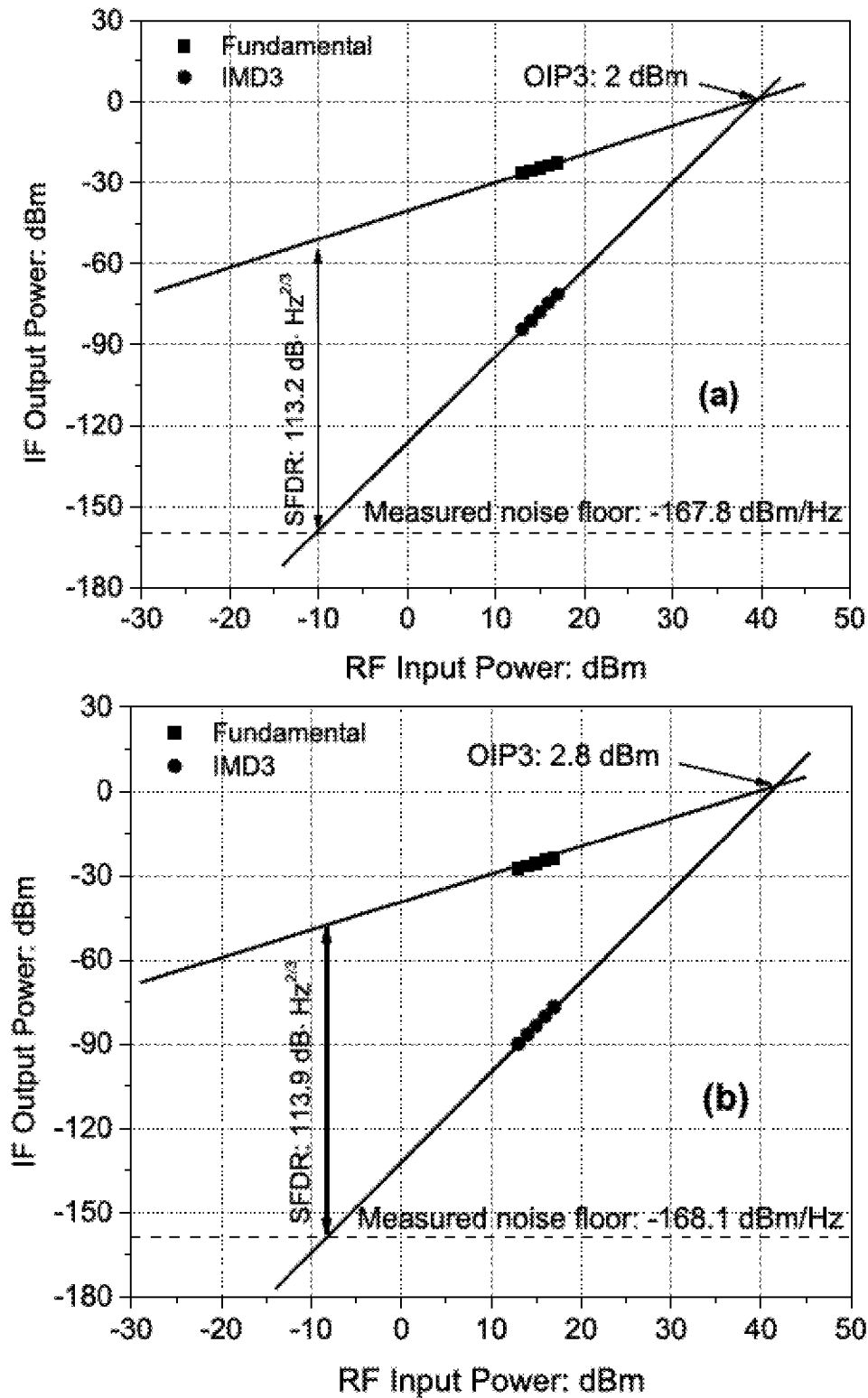
FIGS. 6a, 6b show linearity measurement results of the optical link: (a) with 1 km optical fiber, (b) without 1 km optical fiber.

The long-term stability of the Sagnac loop phase modulated RF photonic link was first evaluated. The phase modulated RF photonic link remains phase-locked when the output voltage of the slow feedback control circuit is well-confined between its voltage rails (i.e. +/−8 Volt). Therefore, the long term stability of the loop can be determined by observing the output voltage of the slow feedback control circuit. In this measurement the voltage signal was recorded for 12 hours. The voltage waveform was captured with and without a 1 km fiber delay. As shown in FIGS. 6a, 6b, the captured voltage waveform for the loop with 1 km fiber transmission fluctuates between −2 to +2 volts, which is well within the voltage rails of the slow feedback control electronics. Thus, it remains stable phase-locked throughout the measurement time. For comparison, FIG. 5 also shows the slow feedback output waveform when the 1 km long fiber was removed. No degradation in the loop stability with the 1 km fiber.

Next, the link linearity and output noise were measured. Restricted by optical power handling capacities and insertions loss of the optical circulators and Faraday rotators, the photocurrent of each photodiode inside the ACP-OPLL receiver was limited to 4 mA. FIG. 6a shows the measured link output third-order intercept point (OIP3) at 100 MHz. They are 2 dBm and −168 dBm/Hz, respectively. For comparison, FIG. 6b shows the OIP3 and noise floor measurement when the 1 km fiber was removed. Without the optical loss from the 1 km fiber, the photocurrent of each photodetector inside the ACP-OPLL increases to ~5 mA, resulting slightly higher ACP-OPLL open loop gain and demodulation linearity. The measured OIP3 without the 1 km fiber is increased by 0.8 dB. However, the noise floor remains almost unchanged. Except for the higher optical insertion loss, no penalties in either the OIP3 or the noise floor due to signal transmission in the 1 km long fiber were observed.

The modified Sagnac loop phase modulated link should be applicable to longer fiber delays, as the random phase fluctuations within the long fiber delay should cancel between the two rotating optical waves. In addition, the link instantaneous bandwidth (IBW) is limited by the bandwidth of the ACP-OPLL PIC. With help of optical domain RF frequency down-conversion (see, for example, D. Zibar, L. A. Johansson, H. F. Chou, A. Ramaswamy, M. J. W. Rodwell, and J. E. Bowers, "Investigation of a novel optical phase demodulator based on a sampling phase-locked loop," in *Proc. Int. Topical Meeting Microw. Photon.*, Oct. 2006, pp. 1-4, or R. Wang, A. Bhardwaj, and Y. Li, "Efficient RF frequency down-conversion using coupled quantum-well optical phase modulator," IEEE *Photon. Technol. Lett.*, vol. 23, no. 10, pp. 645-647, May 15, 2011, which are are incorporated by reference herein in their entirety and for all purposes), the link operation frequency can be extended to higher RF frequencies.

The coherent phase modulated RF photonic link employing an ACP-OPLL linear phase demodulator can achieve a large SFDR. However, the phase coherent system is prone to environmental perturbations, which limit its field applications. For solution, the subject technology presents a modified Sagnac loop coherent phase modulated RF photonic link structure. The modified Sagnac loop eliminates the random optical phase perturbation inside a long optical fiber. In addition, with the help of a unidirectional optical phase modulator, the RF information is only encoded on one of the counter-propagating optical signals inside the loop. Stable signal transmission over 1 km optical fiber has been demonstrated in the proof of concept experiment. In the modified Sagnac loop topology, except for higher optical loss, long distance fiber transmission showed no penalty to the noise and linearity performance.

While the subject technology has been described with respect to preferred embodiments, those skilled in the art will readily appreciate that various changes and/or modifications can be made to the subject technology without departing from the spirit or scope thereof. For example, each claim, in whole or in part, may depend from any or all claims in a multiple dependent manner even though such has not been originally claimed.

What is claimed is:

1. An RF photonic link comprising:
    a 2×2 optical coupler having input ports and two output ports, with an input port being connected to an optical input source;
    a first circulator wherein a first output port of the 2×2 optical coupler is configured to provide input to the first circulator;
    a second circulator, wherein a second output port of the 2×2 optical coupler is configured to provide input to the second circulator;
    a unidirectional phase modulator having at least two ports, wherein the unidirectional phase modulator is configured to receive RF input;
    a first optical fiber optically connecting the first circulator to a first port of the unidirectional phase modulator and being configured to transmit light traveling in a first direction in a first polarization state; and
    a second optical fiber optically connecting a second port of the unidirectional phase modulator to the second circulator and being configured to transmit light traveling in a second direction opposite to the first direction in a second polarization state;
    wherein the first and second circulators are configured to provide optical input to a dual input demodulator,
    wherein the first and second polarization states are orthogonal in the unidirectional phase modulator and are the same outside of the unidirectional phase modulator.

2. The RF photonic link of claim 1 wherein the dual input demodulator is includes an attenuation counter-propagating optical phase locked loop (ACP-OPLL) demodulator, the ACP-OPLL demodulator comprising:
    two ACP phase modulators, each ACP phase modulator being configured to receive optical input from one of the first or second circulator;
    a 2×2 optical coupler including two input ports and two output ports, each input port being optically connected to an output of each ACP phase modulator;
    a balanced photodetector pair, each photodetector of the pair being configured to receive input from one output port of the 2×2 optical coupler of the ACP-OPLL demodulator, wherein a feedback loop from an output of the balanced photodetector pair is connected to electrical input to one of the ACP phase modulators.

3. The RF photonic link of claim 1 wherein the first and second optical fibers are polarization maintaining fibers.

4. The RF photonic link of claim 3 wherein the optical coupler is a polarization maintaining optical coupler; and
    wherein the first and second circulators are polarization maintaining circulators.

5. The RF photonic link of claim 2 wherein each photodetector in the balanced photodetector pair is a uni-traveling-carrier (UTC) photodetector.

6. The RF photonic link of claim 1 wherein the unidirectional phase modulator comprises:
    a first 45° Faraday rotator;
    an electro-optic modulator optically positioned to receive electromagnetic radiation from the first 45° Faraday rotator; and
    a second Faraday rotator optically positioned to receive electromagnetic radiation from the electro-optic modulator.

7. The RF photonic link of claim 6 wherein the electro-optic modulator is a z-cut electro-optic modulator.

8. The RF photonic link of claim 6 wherein the electro-optic modulator is a lithium niobate modulator.

9. A method for mitigating an effect of random phase perturbations in phase modulated optical links, the method comprising:
    splitting output from an optical source into two beams;
    providing a first beam from the two beams to one port of an optical loop so that the first beam propagates in a first direction in a first polarization state in the optical loop;
    providing a second beam from the two beams to another port of the optical loop so that the second beam propagates in a second direction opposite the first direction in a second polarization state in the optical loop, wherein the optical loop includes a first optical fiber connecting said one port of the optical loop to a first port of a unidirectional phase modulator and wherein the optical loop includes a second optical fiber connecting a second port of the unidirectional phase modulator, wherein the second port is opposite the first port of the unidirectional phase modulator, to said another port of the optical loop;
    phase modulating one of a beam propagating in the first direction in the optical loop or a beam propagating in the second direction in the optical loop;
    providing the beam propagating in the first direction in the optical loop to one input of a dual input demodulator; and
    providing the beam propagating in the second direction in the optical loop to another input of the dual input demodulator,
    wherein the first and second polarization states are orthogonal in the unidirectional phase modulator and are the same outside of the unidirectional phase modulator.

10. The method of claim 9 wherein splitting output from an optical source into two beams comprises connecting the optical source to one input port of a 2×2 optical coupler.

11. The method of claim 9 wherein the dual input demodulator is an attenuation counter-propagating optical phase locked loop (ACP-OPLL) demodulator.

* * * * *